United States Patent [19]

Stern

[11] Patent Number: 5,581,615
[45] Date of Patent: Dec. 3, 1996

[54] SCHEME FOR AUTHENTICATION OF AT LEAST ONE PROVER BY A VERIFIER

[76] Inventor: Jacques Stern, 16, rue Vandrezanne, F-75013 Paris, France

[21] Appl. No.: 366,455

[22] Filed: Dec. 30, 1994

[30] Foreign Application Priority Data

Dec. 30, 1993 [FR] France .................... 93 15879

[51] Int. Cl.$^6$ ................... H04L 9/32; H04L 9/30
[52] U.S. Cl. ............. 380/25; 380/21; 380/23; 380/30; 380/49
[58] Field of Search ................. 380/21, 23, 24, 380/25, 30, 49

[56] References Cited

U.S. PATENT DOCUMENTS

| | | | |
|---|---|---|---|
| 4,926,479 | 5/1990 | Goldwasser et al. | 380/23 |
| 4,932,056 | 6/1990 | Shamir | 380/23 |
| 5,218,637 | 6/1993 | Angebaud et al. | 380/23 |
| 5,245,657 | 9/1993 | Sakurai | 380/25 |
| 5,297,206 | 3/1994 | Orton | 380/30 |
| 5,373,558 | 12/1994 | Chaum | 380/23 |

FOREIGN PATENT DOCUMENTS 0252499  1/1988  European Pat. Off. .......... G07F 7/10

OTHER PUBLICATIONS

Advances in Cryptology—CRYPTO '93, 13th Annual International Cryptology Conference, Aug. 1993, Jacques Stern, "A New Identification Scheme Based on Syndrome Decoding", pp. 13–20.

"Method and Apparatus for Access–Control and Identification Based on Syndrome Decoding", Jacques Stern, Jul. 8, 1992, pp. 1–6.

Communications of the ACM, Jan. 1983, vol. 26, No. 1, R. L. Rivest, et al., "A Method for Obtaining Digital Signatures and Public–Key Cryptosystems", pp. 96–98.

Primary Examiner—Bernarr E. Gregory
Attorney, Agent, or Firm—Oblon, Spivak, McClelland, Maier & Neustadt, P.C.

[57] ABSTRACT

A new procedure for authentication of at least one prover by a verifier, the authentication being based on public and secret key cryptographic techniques and making use of a zero-knowledge protocol. In addition, this protocol is established using the problem of constrained linear equations and finds applications in cryptography. This procedure uses a published matrix M of dimension m×n where coefficients are chosen at random from the integers from 0 to d−1, where d is generally a prime number close the square of a number c. The "prover" authenticates itself to a "verifier" by performing hashing functions based on a randomly chosen vector U of dimension m and a randomly chosen vector V of dimension n, the results of which are called commitments and are sent to the prover. The prover then chooses one of several predefined functions and requests that the verifier perform this one predefined function. When the verifier receives a result of the predefined function, it compares the result with the commitments to determine if the prover has provided a correct set of responses. The procedure also can be repeated for other random vectors U and V for increased security.

14 Claims, 2 Drawing Sheets

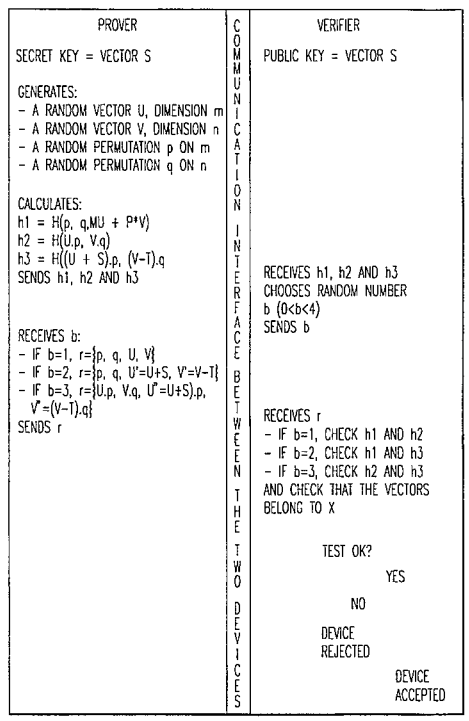

| PROVER | COMMUNICATION INTERFACE BETWEEN THE TWO DEVICES | VERIFIER |
|---|---|---|
| SECRET KEY = VECTOR S | | PUBLIC KEY = VECTOR S |
| GENERATES:<br>- A RANDOM VECTOR U, DIMENSION m<br>- A RANDOM VECTOR V, DIMENSION n<br>- A RANDOM PERMUTATION p ON m<br>- A RANDOM PERMUTATION q ON n<br><br>CALCULATES:<br>$h1 = H(p, q, MU + P*V)$<br>$h2 = H(U.p, V.q)$<br>$h3 = H((U + S).p, (V-T).q)$<br>SENDS h1, h2 AND h3 | | RECEIVES h1, h2 AND h3<br>CHOOSES RANDOM NUMBER<br>b (0<b<4)<br>SENDS b |
| RECEIVES b:<br>- IF b=1, r={p, q, U, V}<br>- IF b=2, r={p, q, U'=U+S, V'=V-T}<br>- IF b=3, r={U.p, V.q, U''=U+S).p,<br>  V''=(V-T).q}<br>SENDS r | | RECEIVES r<br>- IF b=1, CHECK h1 AND h2<br>- IF b=2, CHECK h1 AND h3<br>- IF b=3, CHECK h2 AND h3<br>AND CHECK THAT THE VECTORS<br>BELONG TO X<br><br>TEST OK?<br>          YES<br>  NO<br>DEVICE<br>REJECTED<br>        DEVICE<br>        ACCEPTED |

*FIG. 1*

| PROVER | VERIFIER |
|---|---|
| SECRET KEY = VECTOR S | PUBLIC KEY = VECTOR S |
| GENERATES:<br>- A RANDOM VECTOR U, DIMENSION m<br>- A RANDOM VECTOR V, DIMENSION n<br>- A RANDOM PERMUTATION p ON m<br>- A RANDOM PERMUTATION q ON n | |
| CALCULATES:<br>$h1 = H(p, q, MU + P*V)$<br>$h2 = H(U.p, V.q)$<br>SENDS h1, h2 AND h3 | RECEIVES h1, AND h2<br>CHOOSES RANDOM NUMBER<br>$a$ $(0<a<d-1)$<br>SENDS $a$ |
| RECEIVES $a$:<br>CALCULATES:<br>$Y=(aS+U).p$<br>$Z=(aT-V).q$<br>$T=k(M(S))$<br>SENDS Y AND Z | RECEIVES Y AND Z<br>CHOOSES RANDOM BIT b (b=0,1)<br>SENDS b |
| RECEIVES b:<br>- IF b=0, r={p, q}<br>- IF b=1, r={U'=S.p, V'=T.q}<br>SENDS r | RECEIVES r<br>- IF b=0, CHECK h1<br>- IF b=1. CHECK h2<br>AND CHECK THAT THE<br>VECTORS BELONG TO X<br><br>TEST OK?<br>    YES<br>   NO<br>DEVICE<br>REJECTED<br><br>    DEVICE<br>    ACCEPTED |

COMMUNICATION INTERFACE BETWEEN THE TWO DEVICES

*FIG. 2*

SCHEME FOR AUTHENTICATION OF AT LEAST ONE PROVER BY A VERIFIER

This invention relates to a new procedure for authentication of at least one identification device by a verification device, the authentication making use of a zero-knowledge protocol based on the problem of constrained linear equations (CLE).

The CLE problem consists in finding values that satisfy a certain number of linear equations modulo a prime number d and that, in addition, are members of a prescribed set X.

The present invention applies particularly to so-called "protected" to "secure" communications in which two devices, an identification device (conventionally called the prover) and a verification device (conventionally called the verifier), exchange data across a channel whose security is unsure. In this situation it is imperative to have a means of mutual recognition, in other words means enabling a verifier to authenticate the identity of a user before giving him access to data or services. There are many situations requiring such means of protected communication. Good examples are banking computers that transmit financial transactions, automatic bank note distributors, pay-per-view television decoders, and public telephones.

For these applications authentication schemes commonly used are based on methods of encryption of secret keys. Until today these have been the most simple techniques available. In such cases the prover, which is generally a smart-card, and the verifier, such as a card reader, a decoder or a public telephone, share the same secret key. The identification is accomplished by a symmetrical algorithm or by a function operating unidirectionally.

The drawback of these methods is that the two parties (the prover and the verifier) must co-operate with each other—and in secrecy. This condition is not always verified. For example, a forger may purchase the verification device and analyse it in order to understand its internal operation and subsequently fabricate high-performance devices, since the secret keys are present at both ends of the communication line, both the prover and verifier.

It is known that, among the procedures used to overcome the disadvantages of known traditional methods, until the present time zero-knowledge protocols have provided the highest levels of security. These zero-knowledge protocols are functionally characterized by the fact that even an unlimited number of transactions with the verifier and a complete analysis of this verifier itself are insufficient to reproduce the device. Descriptions of zero-knowledge proofs have been published, notably in the U.S. Pat. No. 4,748,668 in the name of Fiat et al., and in the U.S. Pat. No. 4,932,056 in the name of Shamir. The latter patent describes an authentication scheme, known under the name "PKP", based on the so-called permuted kernels problem.

The present inventor has developed a new authentication scheme based on the problem of syndrome decoding. This problem is described in the article entitled "A new identification scheme based on syndrome decoding" by Jacques Stern, presented at the CRYPTO 93 Congress (proceedings of which are to appear in "Lecture Notes in Computer Science"). The disadvantage of the various methods described above is that the exchanges of information between provers and verifiers are relatively slow. Moreover, the public or secret keys employed in these methods are generally coded using a very large number of bits, requiring considerable processing power and memory capacity.

SUMMARY OF THE INVENTION

The purpose of the present invention is therefore to overcome the disadvantages mentioned above by proposing a new authentication scheme enabling rapid authentication of the prover by the verifier and enabling the use of public and secret keys of moderate size.

The object of the present invention is a procedure for the authentication of at least one prover by a verifier based on cryptographic techniques using secret and public keys, this authentication being achieved by means of a zero-knowledge protocol, wherein the public key is established by using constrained linear equations. This procedure preferably comprises the following steps:

— to enable a dialog between the prover and the verifier, establish a secret key, consisting of at least one vector S of dimension n whose co-ordinates are chosen from a fixed set X, and a public key comprising a matrix M of dimensions m×n whose coefficients are chosen at random from integer values from 0 to d−1, where d is a prime integer close to the square of a number c, and at least one vector P such that P=g(M(S)), where g is a function defined by a set X and a subgroup G of the set of integers (1, 2, . . . d−1) and which associates an element g(x) of G to each co-ordinate x of the vector P such that x is described uniquely as the product of g(x) and an element k(x) of X;

— the prover generates one or more random numbers (U, V) and sends to the verifier a commitment obtained by applying a cryptographic hash function to parameters which are functions of S, M and the random numbers;

— depending on the random number(s) chosen by the verifier, the verifier checks, using the values received and the public key, that the commitment is correct, — repeat the previous operations several times, depending on the level of security required.

In the above authentication scheme we use an m×n matrix M that is common to all users and constructed randomly. Each user receives a secret key S which is an n-bit word whose co-ordinates are chosen from a fixed set X. This set X comprises c elements, such that all integers from 1 to d−1 are described uniquely as a product of an element of G and an element of X. In this case, the system calculates the public key P such that P=g(M(S)).

Furthermore, the identification procedure is based mainly on the technical notion of commitment. If U is a sequence of binary elements, a commitment for U is the image of U generated via a given cryptographic hash function. The commitment will be used as a one-way function. In other words, it is disclosed by announcing the original sequence from which it was built. The hash function itself can be obtained, for example, using the "MD4" method described by R. Rivest at the CRYPTO 90 Congress (CRYPTO 90 proceedings, collection "Lecture Notes in Computer Science, pp. 303–311). We could also use the modification of this method introduced under the name "MD5", or the American standard SHA (secure hash standard, Federal Information Processing Standards Publications, 30 Oct. 1992). Finally, in place of the hash function it is possible to use an encryption algorithm such as the DES (Data Encryption Standard) in which the message to be hashed plays the role of the key and/or of the plain text to be coded. However, we recommend that this hashing be iterated so that the condensed result of the hashing preferably has 128 bits.

The prover also uses a random permutation generator used to permute binary vectors. Such a generator can be made from a source of digitized white noise, for example an inversely polarized diode in the so-called "elbow" zone, or can be made using the software methods described in U.S. Pat. Nos. 4,817,147 by Gunter, or 4,649,419 by Aragon.

According to a first embodiment of the authentication procedure according to the invention, in a first step common to all the various procedures, the prover reveals its identity and/or its signed public key to the verifier, then:

— After having chosen at random two vectors U and V, of dimensions m and n respectively and consisting of integers from 0 to d−1, and two permutations p and q respectively of m and n elements, the prover calculates and sends to the verifier the commitments h1, h2 and h3 generated via a hashing function H:

$h1=H(p, q, MU+P*V)$ h2=H(U.p, V.q)

$h3=H(U+S).p, (V−T).q$ where P*V designates the term-by-term product of the components of vectors P and V, modulo d, and T is the vector k(M(S)), which can be calculated as a function of S by the prover or stored in a physically inaccessible part of the memory of the device;

— The verifier chooses at random a number "b" such that 0<b<4, and sends it to the prover;
— The prover then returns a reply r defined as follows:
 • If b=1, then r consists of values p, q, U and V;
 • If b=2, then r consists of p, q, and the vectors U'=(U+S) and V'=(V−T);
 • If b=3, then r consists of the vectors U.p, V.q, U"=(U+S).p and V"=(V−T).q;
— The verifier receives the reply r and proceeds as follows:
 • If b=1, it calculates from the elements received (p, q, U and V) the values of MU+P*V, U.p, and V.q which must, if the reply is correct, be such that:

$h1=H(p, q, MU+P*V)$ h2=H(U.p, V.q);

• If b=2, it calculates from the elements received (p, q, and vectors U' and V') the values of MU'+P*V', U'.p, and V'.q which must, if the reply is correct, be such that:

$h1=H(p, q, MU'+P*V)$ h3=H(U'.p, V'.q);

• If b=3, it verifies that the following is true:

h2=H(U.p, V.q);

h3=H(U", V")

and the verifier also calculates the two vectors U"−U.p and V"−V.q and checks that they are composed only of elements of X.

In another preferred embodiment of the authentication procedure according the invention, in a first step common to all the various procedures, the prover reveals its identity and/or its signed public key to the verifier, then:

— After having chosen at random two vectors U and V, of dimensions m and n respectively and consisting of integers from 0 to d−1, and two permutations p and q respectively of m and n elements, the prover calculates and sends to the verifier the commitments h1 and h2 generated via a hashing function H:

$h1=H(p, q, MU+P*V)$ h2=H(U.p, V.q), where P*V designates the term-by-term product of the components of vectors P and V, modulo d;

— The verifier chooses at random a number "a" from 0 to d−1 and sends it to the prover;
— The prover then calculates and sends to the verifier the vectors:

$Y=(aS+U).p$ $Z=(aT−V).q$ where T is the vector k(M(S)) which can be calculated as a function of S by the prover or stored in a physically inaccessible part of the memory of the device;

— The verifier chooses at random a bit "b" (=0 or 1), and sends it to the prover;
— The prover then returns a reply r defined as follows:
 • If b=0, then r consists of the values p and q,
 • If b=1, then r consists of vectors U'=S.p and V'=T.q;
— The verifier receives the reply r and proceeds as follows:
 • If b=0, it calculates from the elements received (p, q) the vectors Y' and Z' such that (Y').p=Y and (Z').q=Z, then the vector M(Y')−P*Z' which must, if the reply is correct, be such that:

$h1=H(p, q, M(Y')−P*Z')$;

• If b=1, the verifier calculates the vectors Y−aU' and aV'−Z, which must, if the reply is correct, be such that:

$h2=H(Y−aU, aV'−Z)$;

and the verifier also checks that the vectors U' and V' contain only elements of X.

BRIEF DESCRIPTION OF THE DRAWINGS

Other characteristics and advantages of the present invention will become apparent in the following description of two preferred embodiments, taken as a non-limitative examples, with reference to the attached drawings:

FIG. 1 is a diagram explaining a first embodiment of the authentication procedure according to the invention;

FIG. 2 is a diagram explaining a second embodiment of the authentication procedure according to the invention.

The invention concerns a new authentication scheme making use of a zero-knowledge protocol. In this case, the security of the procedure is based on the problem of constrained linear equations (CLE). The CLE problem consists of finding n values that satisfy a certain number of linear equations modulo a prime number d and that, in addition, are members of a prescribed set X. If the number of variables is large, this problem becomes very difficult to resolve using known means of calculation. The system described here in fact corresponds to the case of m equations with n+m variables, with m=n=20, a case which greatly exceeds the capacities of today's computers.

In order to implement the authentication scheme according to the invention, an Authority chooses and publishes a matrix M of dimension m×n, preferably with m=n. This matrix comprises coefficients chosen at random from the integers from 0 to d−1, where d is generally a prime integer close to the square of a number c. Preferably, d=257, equal to (16×16)+1. The Authority also chooses a set of vectors S of dimension n whose co-ordinates are chosen at random from a set X. The set X is determined as a function of a set G known as a multiplicative group formed from the series of successive power of a number, modulo d, this set being selected such that the number of elements in set G is c. In this case, there then exists a set X also formed from c elements and such that all integers between 1 and d−1 are defined uniquely as the product of an element of set G and an element of set X. We shall therefore denote by g(u) the element of G involved in the unique decomposition of an integer u between 1 and d−1, and by k(u) the corresponding element of X. If U is a vector composed of integers from 1 to d−1, g(u) is constituted by images of the co-ordinates of U via G. k(U) is similarly defined.

The secret key determined in this manner is distributed to the various provers. In addition, all the public keys constituted by the vector P=g(M(S)) are made known. In the framework of the present invention, this public key can be coded using a small number of bytes, as can the secret key, using a table of the elements of G and X. Thus, if d=257 and m=n=20, we obtain keys of 10 bytes, which is an advantage of the present procedure over other known zero-knowledge protocols.

We shall now describe two embodiments specific to the authentication scheme according to the invention.

The first procedure is described with reference to FIG. 1 which shows schematically the communication protocol used between the prover and the verifier in order to perform an authentication. The prover, which could be in the form, for example, of a smart-card or an electronic key, must be physically inaccessible. For example, in the case of a smart-card it must be impossible to read its internal memory. On the other hand, no requirements are imposed as to the environment in which the verifier operates. Moreover, the prover contains in its non-volatile memory its secret key S, which is the vector S of dimension n and the matrix M of dimension m×n whereas the verifier contains in its non-volatile memory all the public keys constituted by the vectors P, or sufficient data to verify that a signed key P has been produced by an approved Authority. When the prover wishes to communicate with a verifier the two devices execute the following protocol:

— First, the prover reveals to the verifier its identity and/or its signed key; the verifier verifies that the identity corresponds to P;

— Next, the prover chooses at random two vectors U and V of dimensions m and n, respectively, preferably with m=n, constituted from integers from 0 to d−1, plus two random permutations p and q, of m and n elements respectively. The prover then calculates the following commitments and sends them to the verifier:

$h1=H(p, q, MU+P*V)$ $h2=H(U.p, V.q)$ $h3=H((U+S).p, (V−T).q)$ where P*V designates the term-by-term product of the components of vectors P and V, modulo d, and T is the vector k(M(S));

— The verifier selects a random number "b" such that 0<b<4, and sends it to the prover;

— The prover sends to the verifier a reply r defined as follows:

- If b=1, then r consists of values p, q, U and V;
- If b=2, then r consists of p, q, and vectors U'=(U+S) and V'=(V−T);
- If b=3, then r consists of vectors U.p, V.q, U"=(U+S).p and V"=(V−T).q;

— The verifier receives the reply r and proceeds as follows:

- If b=1, it calculates from the elements received (p, q, U and V) the values of MU+P*V, U.p, and V.q which must, if the reply is correct, be such that:

$h1=H(p, q, MU+P*V)$ $h2=H(U.p, V.q).$

- If b=2, it calculates from the elements received (p, q, and vectors U' and V') the values of MU'+P*V', U'.p, and V'.q which must, if the reply is correct, be such that:

$h1=H(p, q, MU'+P*V')$ $h3=H(U'.p, V'.q);$

- If b=3, it verifies that the following is true:

$h2=H(U.p, V.q)$ $h3=H(U",V")$ and the verifier also calculates the two vectors U"−U.p and V.q−S" and checks that they are composed only of elements of X.

If all the above tests are successful, the verifier considers that the authentication protocol has terminated successfully and it sends a control signal to the input/output interface of the protected system in order to enable a transaction; otherwise the prover is rejected.

The verifier may repeat the steps described above t times, if a higher level of security is required.

The operations described above are summarized in FIG. 1 in which the left hand side shows the operations performed by the prover and the right hand side those performed by the verifier.

Another embodiment of the authentication scheme according to the invention will now be described with reference to FIG. 2.

This second embodiment requires more calculations that the previous one, but the probability of illegal penetration of the protected system decreases more rapidly. This embodiment includes the following steps, summarized in FIG. 2 which is presented in the same manner as FIG. 1:

— First, the prover reveals to the verifier its identity and/or its signed key, as in the first embodiment.

— Next, the prover chooses at random two vectors U and V of dimensions m and n, respectively (m may be equal to n), constituted from integers from 0 to d−1, plus two random permutations p and q, of m and n elements respectively. The prover then calculates the following commitments and sends them to the verifier:

$h1=H(p, q, MU+P*V)$ $h2=H(U.p, V.q)$ where P*V designates the term-by-term product of the components of vectors P and V, modulo d, and H is a cryptographic hash function.

— The verifier selects a random number "a" from 0 to d−1 and sends it to the prover.

— The prover calculates and sends to the verifier the vectors:

$$Y=(aS+U).p$$

$$Z=(aT-V).q$$

where T is the vector k(M(S)) which can be calculated as a function of S by the prover or stored in a physically inaccessible part of the memory of the device;

— The verifier chooses at random a bit "b" (=0, 1), and sends it to the prover;

— The prover returns a reply r defined as follows:
- If b=0, then r consists of the values p and q,
- If b=1, then r consists of vectors U'=S.p and V'=T.q.

— The verifier receives the reply r and proceeds as follows:
- If b=0, it calculates from the elements received (p, q) the vectors Y' and Z' such that (Y').p=Y and (Z').q=Z, then the vector M(Y')−P*Z' which must, if the reply is correct, be such that:

$$h1=H(p, q, M(Y')-P*Z');$$

- If b=1, the verifier calculates the vectors Y−aU' and aV'−Z, which must, if the reply is correct, be such that:

$$h2=H(Y-aU, aV'-Z)$$

and the verifier also checks that the vectors U' and V' contain only elements of X.

If the test on b is successful, the verifier considers that the authentication protocol has terminated successfully and it sends a control signal to the input/output interface of the protected system in order to enable a transaction; otherwise the prover is rejected.

To increase the level of security the prover and verifier may repeat the steps described above t times, in which case the authentication protocol is considered to be successful only if the tests in all the rounds are successful. Preferably t will be chosen such that 0<t<60. For the first and second embodiments described above, the values t=35 and t=20, respectively, provide a satisfactory level of security in many applications.

The two embodiments described are non-limitative: they could be modified in a number of ways while remaining in the framework of the invention.

What is claimed is:

1. Method for authenticating a prover by a verifier based on a cryptographic technique using a secret key, a public key and a zero-knowledge protocol, the method comprising the steps of:

generating a secret key S for the prover using constrained linear equations;

generating a public key P based on said secret key;

sending plural messages between the prover and the verifier; and authenticating the prover by the verifier based on said secret key S, said public key P and said plural messages.

2. Method for authenticating a prover by a verifier based on a cryptographic technique using a secret key, a public key and a zero-knowledge protocol, the method comprising the steps of:

a) generating a secret key, including at least one vector S of dimension n having coordinates chosen from a set X, b) generating a matrix M of dimensions m×n whose coefficients are chosen at random from integer values from 0 to d−1, where d is a prime integer close to the square of a number c, c) generating a public key comprising at least one vector P such that P=g(M(S)), where g is a function defined by said set X and a subgroup G of a set of integers (1, 2, . . . d−1) and which associates an element g(x) of G to each coordinate x of the at least one vector P such that x is described uniquely as a product of g(x) and an element k(x) of X;

d) generating at least two random vectors by the prover;

e) generating plural commitments by applying a cryptographic hash function to functions of S, M and the at least two random numbers;

f) exchanging plural messages between the prover and the verifier based on said public key and said secret key; and g) authenticating the prover by the verifier based on said plural messages, said public key and said secret key.

3. Method according to claim 2, further comprising the step of repeating steps d–g a number of times to provide a higher level of security.

4. Method according to claim 2, wherein the step of generating at least two random vectors comprises generating two random vectors U and V, of dimensions m and n, respectively, composed of integers from 0 to d−1 and generating two permutations p and q respectively of m and n elements.

5. Method according to claim 2, wherein m=n.

6. Method according to claim 2, wherein d=257 and n=20.

7. Method according to claim 2, further comprising the step of revealing an identity of the prover by sending a signed public key of the prover to the verifier.

8. Method according to claim 2, wherein the steps d–g are iterated t times, where t increases with an increasing level of security required, and wherein the step of authenticating the prover by the verifier only succeeds if in comparisons all iterations are successful.

9. Method according to claim 2, wherein the step of generating plural commitments comprises calculating commitments h1 and h2 based on a hash function H according to:

$$h1=H(p, q, MU+P*V)$$

$$h2=H(U.p, V.q)$$

wherein P*V designates a term-by-term product, modulo d, of the vectors P and V;

wherein the step f) of exchanging plural messages comprises the sub steps of:

f)(i) choosing a random number a from 0 to d−1 by the verifier;

f)(ii) sending the random number a from the verifier to the prover;

f)(iii) calculating, by the prover, plural vectors Y and Z according to:

$$Y=(aS+U).p$$

$$Z=(aT-V).q,$$

where T=k(M(S));

f)(iv) sending the plural vectors (Y,Z) from the prover to the verifier;

f)(v) choosing, by the verifier, a random bit b;

f)(vi) sending the random number bit b to the prover;

f)(vii) returning a reply r such that if the random bit b=0, then the reply r includes p and q, whereas if the random bit b=1, then the reply r includes vectors U'=S.p and V'=T.q; and f)(viii) receiving the reply r at the verifier from the prover; and wherein the step g) of authenticating the prover by the verifier comprises the sub-steps of:

g)(i) calculating, if b=0, vectors Y' and Z' such that (Y').p=Y and (Z').q=Z, and vector M(Y')–P*Z';

g)(ii) comparing, if b=0, if $$h1=H(p, q, M(Y')-P*Z');$$

g)(iii) calculating, if b=1, vectors Y–aU' and aV'–Z;

g)(iv) comparing, if b=1, if $$h2=H(Y-aU, aV'-Z)$$

and if the vectors U' and V' contain only elements of X; and g)(v) authenticating the prover if either comparing step g)(ii) or step g)(iv) is true.

10. Method according to claim 9, wherein k(M(S)) is a vector and is calculated as a function of S by the prover.

11. Method according to claim 9, wherein k(M(S)) is a vector and is stored in a memory of the prover which is inaccessible to the verifier.

12. Method according to claim 2, wherein the step of generating plural commitments comprises calculating commitments h1, h2 and h3 based on a hash function H according to:

$$h1=H(p, q, MU+P*V)$$

$$h2=H(U.p, V.q)$$

$$h3=H((U+S).p, (V-T).q)$$

where P*V designates a term-by-term product, modulo d, of vectors P and V, and wherein T=k(M(S));

wherein the step f) of exchanging plural messages comprises the sub-steps of:

f)(i) choosing a random number b by the verifier such that 0<b<4;

f)(ii) sending the random number b to the prover;

f)(iii) returning a reply such that:

if b=1, then reply r consists of values p, q, U and V, if b=2, then reply r consists of p, q, and vectors U'=(U+S) and V'=(V–T), and if b=3, then reply r consists of the vectors U.p, V.q, U''=(U+S).p and V''=(V–T).q; and f)(iv) receiving the reply r at the verifier from the prover; and wherein the step g) of authenticating the prover by the verifier comprises the sub-steps of:

g)(i) calculating, if b=1, values MU+P*V, U.p, and V.q;

g)(ii) comparing, if b=1, if $$h1=H(p, q, MU+P*V) \text{ and if}$$

$$h2=H(U.p, V.q);$$

g)(iii) calculating, if b=2, values MU'+P*V', U'.p, and V'.q;

g)(iv) comparing, if b=2, if $$h1=H(p, q, MU'+P*V') \text{ and if}$$

$$h3=H(U'.p, V'.q);$$

g)(v) calculating, if b=3, two vectors U''–U.p and V''–V.q;

g)(vi) comparing, if b=3, if $$h2=H(U.p, V.q), \text{ if}$$

$$h3=H(U'', V'')$$

and if vectors U''–U.p and V''–V.q are composed only of elements of X; and g)(vii) authenticating the prover if any of the comparing steps g)(ii), g)(iv) and g)(vi) is true.

13. Method according to claim 12, wherein k(M(S)) is a vector and is calculated as a function of S by the prover.

14. Method according to claim 12, wherein k(M(S)) is a vector and is stored in a memory of the prover which is inaccessible to the verifier.

* * * * *